Oct. 23, 1928.
A. G. F. KUROWSKI
TYPE SOLDERING DEVICE
Filed Aug. 1, 1925
1,688,722
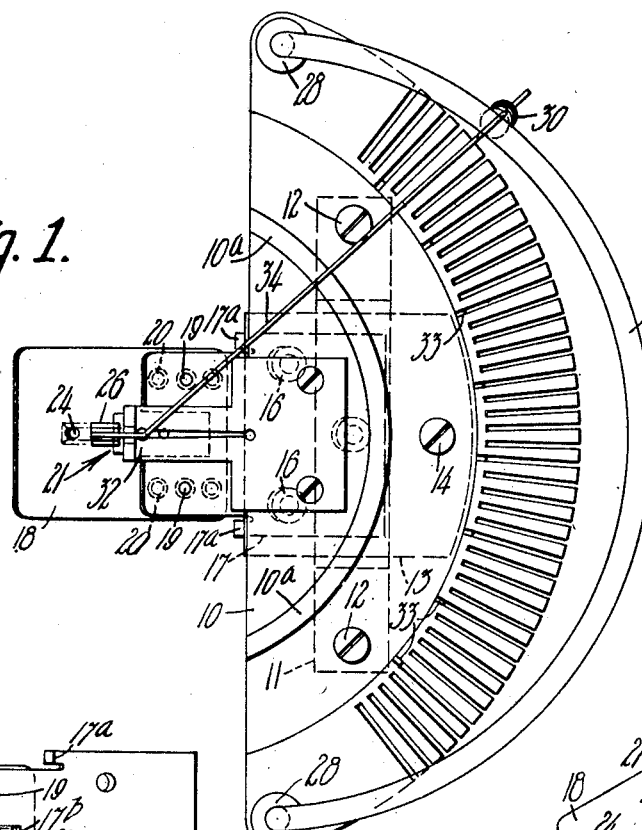
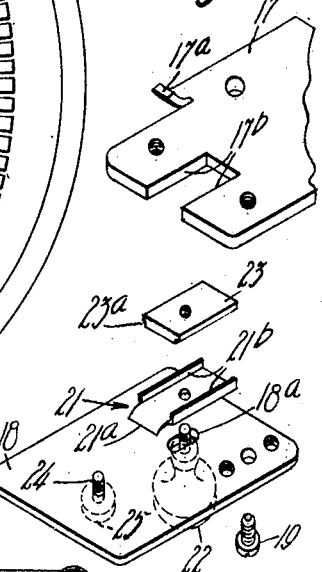
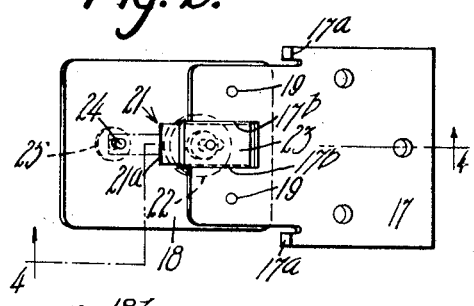
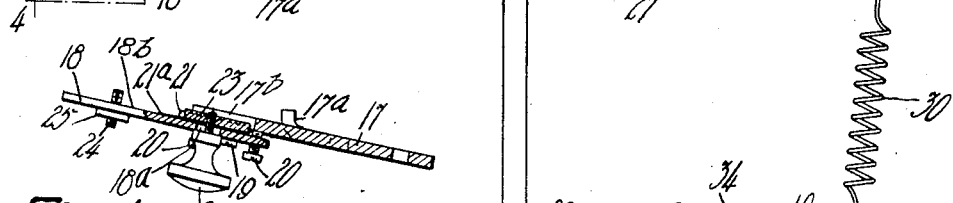
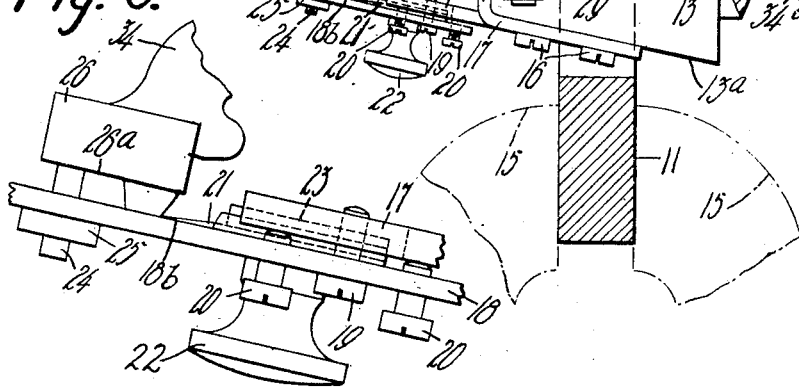
Inventor:
Alfred G. F. Kurowski
by B. C. Stickney
Attorney Patented Oct. 23, 1928.

1,688,722

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

TYPE-SOLDERING DEVICE.

Application filed August 1, 1925. Serial No. 47,534.

This invention relates to means for soldering types to the type-bars of typewriting machines; the type-blocks being secured to the type-bars by the application of solder while they are positioned by the gage.

A feature of this invention is the provision of simple adjustable and improved means for gaging the position of the type with relation to the type-bar in a manner to obtain final alignment of the type-characters with respect to the printing line. To attain this result, I provide an adjustable gage having a sharp razor-edge and constituting a corner-edge gage which gages the type at the corner thereof formed by the face and the sides of said type. The sides of the type do not all extend from the face at the same angle. By reaching the corner-edge of the type the razor-edge gages all of said type at their point of contact with the platen and due to this fact a great deal of skilled labor heretofore necessary in obtaining final alignment has been eliminated.

Typewriting machines of the same make and model are not exactly alike. Slight variations occur in the typing mechanism and in the position of the platen relative thereto. These variations, although minute, are in many cases sufficient to render a type-carrying bar which is suitable for one machine, not suitable for another machine. The type-face may strike squarely upon the platen when used in one machine, but strike at a slight angle when in another machine. Therefore, in order to render the soldering device capable of taking care of said slight variations, means are provided for effecting fine adjustment of the relative positions of the type-bar and the type-head before soldering them together.

The device is particularly valuable for repair work in which an old bar is taken out and a new type-head affixed thereto. A fixed gage would not be capable of handling such work to the end of obtaining final alignment of the type.

Other features and advantages will hereinafter appear.

In the accompanying drawings,

Figure 1 is a top plan view of the gage with an Underwood type-bar and special type-block in place.

Figure 2 is a top plan view of the gaging elements assembled.

Figure 3 is a perspective view of the gaging elements disassembled and separated.

Figure 4 is a view of a cross-section indicated by the line 4—4 in Figure 2.

Figure 5 is a side view of the gage partly broken away and sectioned for clear illustration, and this view also shows a central type-bar and type-block in place.

Figure 6 is an enlarged side view of the gaging elements, showing more particularly their relation to the type-block.

As shown in the accompanying drawings, the gage comprises an Underwood Standard type-bar segment 10 secured to a yoke-like block 11 by screws 12. The block 11 is formed to straddle a block 13, which is secured to the type-bar segment by screw 14 and screws 16 which are threaded into the segment 10. The block 11 is provided so that the gage may be held thereby and clamped in the jaws 15 of a vise suitably mounted upon a work-bench or table. A base attached to the block 11 may be provided to hold the gage erect instead of supporting it in the vise.

The block 13 has a face 13$^a$ which is substantially parallel to the plane in which it is desired to fix the face of the type. Secured against said face 13$^a$ by the screws 16 is the plate 17 to which the gaging elements are attached and related. A plate 18 is clamped in adjustable relation to plate 17 by screws 19, the inclination and proximity of the plate 18 to the plate 17 being adjustable by means of four screws 20. Said screws 20 are threaded through plate 18, their ends abutting against plate 17. This provides for a close and variable adjustment of the gaging surface at 18$^b$, which may not be definitely established by plate 17 alone. The plate 17 has tabs 17$^a$ by which said plate is seated against the narrow end of block 13.

For latitudinal gaging and fixing of the type, there is provided a channel-shaped gage-piece 21 which is clamped in adjustable relation to plate 18 by means of the thumb-screw 22 and the block 23. Said gage-piece 21, being made of thin steel, is channel-shaped to give it the requisite stiffness. Its aging edge 21$^a$ is further thinned down to about three one-thousandths of an inch in thickness so as to gage exactly at the base of the type-character, as already explained. A slight bend or curl at the gaging end of 21 insures the gaging edge lying close against the plate 18 when the thumb-screw 22 is tightened.

The direction of adjustment of the gage-piece 21 is guided by means of the block 23, the outer sides of which engage the side 17$^b$ of the rectangular cut in the end of plate 17. Furthermore, the sides of said block 23 are undercut as shown at 23$^a$, Figure 3, to engage the sides 21$^b$ of the gage-piece 21. The hole 18$^a$ in the plate 18 is elongated to give the necessary clearance for the shank of the thumb-screw 22.

For facilitating the proper seating of the face of the type against the gaging surface 18$^b$, there is provided an adjustable abutment screw 24 threaded into the plate 18 and locked by a lock-nut 25. Said screw 24 has a squared end against which the surface 26$^a$ of the type-block 26 abuts. In manufacturing the type-blocks, the surface 26$^a$ is maintained at a uniform distance from the face of the type.

The standard type-bar segment 10 has mounted upon it the curved rod 27 which is secured by collars 28 and nuts 29. This rod 27 serves as an anchor for the holding spring 30, said holding spring being common to all type-bars in a set.

The type-bar segment 10 also comprises the curved fulcrum rod 31 and the standard type-bar guide 32, said guide engaging and retaining the end of the type-bar during gaging and soldering. Each type-bar of a set is distinguished by a numeral stamped upon its surface which enables the operator to place the type-bar in the corresponding slot of the type-bar segment. To facilitate the selection of the proper slot, every fifth slot has an index mark 33 adjacent it. Said index mark may be either lines, a numeral, or both.

It will be seen that the arrangement of the parts of the gage is made to duplicate the proper arrangement of the type-bars and faces of the type in the typewriting machine.

In using the gage, the bearing 34$^a$ of a type-bar 34 is hooked over the fulcrum rod 31. The spring 30 holds the type-bar as its rotation about the fulcrum rod 31 is checked by the striking surface 10$^a$ of the segment. While the type-bar is so held the type-block is manipulated and fixed in proper relation to the type-bar by means of the gaging elements herein described. Then, while lightly bearing upon the type-block with a pointed rod or any other suitable implement, so that the type-block bears properly against the gaging elements, solder is applied and the type-block is thus secured to the type-bar. As is usual in Underwood machines, the type-block is slotted to receive the end of the type-bar and the solder is applied to and secures the joint.

Variations may be resorted to within the scope of the invention, and portions of the improvements may be used without others.

Having thus described my invention, I claim:

1. A soldering device for gaging a type-carrying block and a type-bar to which said block is to be soldered, said device having a surface upon which the type is held upon its face, a stud adjustable relatively to said surface and upon which a portion of said type-block is positioned to insure that the face of the type is flat against said surface, and a second gage having a sharp razor-edge constituting a corner-edge gage for gaging the type at the corner thereof formed by the face and the sides of said type.

2. A soldering device for gaging a type and a type-bar to be soldered together, said device having a surface upon which the type is held on its face, a gage including a body-portion having a downwardly-directed lip terminating in a sharp razor-edge, and means for adjustably securing said body-portion in position to hold the razor-edge firmly against said surface, said razor-edge constituting a corner-edge gage for gaging the corner of said type formed by the face and the sides thereof.

3. A soldering device for gaging a type and a type-bar to be soldered together, said device having a surface upon which the type is held upon its face, a gage formed of resilient material including a body-portion having upturned edges for stiffening said body, said gage also including a downwardly-directed tapered lip terminating in a sharp razor-edge, and means for adjustably securing said body-portion upon said surface to cause said tapered lip to flex and thereby press the razor-edge firmly against said surface, said razor-edge constituting a corner-edge gage for gaging the corner of said type formed by the face and the sides thereof.

4. A soldering device for gaging a type and a type-bar to be soldered together, said device having a surface upon which the type is held upon its face, a gage formed of resilient material including a body-portion having upturned edges for stiffening said body, said gage also including a downwardly-directed tapered lip terminating in a sharp razor-edge, means for adjustably securing said body-portion in position upon said surface, said adjustable securing means including guides for said upturned edges of the body-portion, a block fitting upon said body-portion, and means for clamping the block against said body-portion, whereby the latter is held flat against said surface and the lip flexed so as to press said razor-edge firmly against said surface, said razor-edge constituting a corner-edge gage for gaging the corner edge of said type formed by the face and the sides thereof.

5. A soldering device for gaging a type and a type-bar to be soldered together, said device including a support upon which the type-bar is carried, a platform having a surface upon which the type is held on its face, and a type-corner gage having a sharp razor-edge which engages the type-corner formed by the face and the sides of the type, said platform being angularly adjustable to vary the working position thereof with relation to said support so as to enable said device to properly gage the soldering positions for types and type-bars to be used in different machines, wherein the positions of the types with relation to their respective type-bars vary slightly in said different machines.

6. A soldering device for gaging a type and a type-bar to be soldered together, said device including a support upon which the type-bar is carried, a platform having a surface upon which the type is held on its face, a type-corner gage having a sharp razor-edge which is arranged to engage the type at the corner thereof formed by the face and the sides of the type, means for adjustably securing said corner-edge gage to the platform to bring the razor-edge flat against the surface thereof, and means for adjustably varying the position of said platform with relation to said support, the latter including guideways in which said corner-edge gage moves during adjusting thereof, said support permitting adjustment of said platform while retaining said corner-edge gage within said guideways.

7. A soldering device for gaging a type and a type-bar to be soldered together, said device including a support upon which the type-bar is carried, a platform rockably suspended beneath said support, a corner-edge gage adjustably secured to said platform, said gage having a sharp razor-edge which gages the type at the corner thereof formed by the face and the sides of the type, said support including guides within which the corner gage moves during the adjusting thereof, and adjusting screws carried by said platform on both sides of the rocking point thereof, the ends of the screws being positioned to bear against the under side of said support to effect fine variations in the position of said platform relatively to the support, said guides being effective to guide the corner-edge gage both during adjustment thereof and during bodily adjustment of said platform relatively to the support.

8. A soldering device for gaging a type and a type-bar to be soldered together, said device including a support upon which the type-bar is carried, a platform having a surface upon which the type is held on its face, a gage including a body-portion having a portion of the side edges thereof turned up to reinforce the body and a lip terminating in a sharp razor-edge constituting a corner-edge gage for the corner edge of the type formed by the face and the sides thereof, a block arranged to fit over said body and rest upon the edges of the upturned sides of the body, the support including an open slot having parallel side walls forming guides for the sides of the body of said gage and the block, means for clamping said block against said edges, whereby to hold said razor-edge firmly against said surface, said platform having enlarged perforations, loose-fitting screws passing through said perforations and into threaded relation with the support to form a fulcrum for the platform, and adjusting screws threaded through said platform and having the ends thereof positioned against said support, whereby said screws may be adjusted to change the angular position of said platform relatively to the support, said corner-edge gage and the block being controlled by said guides during adjustment of said corner-edge gage along said surface and also during adjustment of said platform about its fulcrum.

9. The combination with a supporting surface for holding types in position to be soldered to their respective type-bars, of a gage for properly aligning said types with respect to said bars, said gage having a rigid body-portion and a spring forward portion terminating in a razor-edge for engagement with the various bevels of a set of types at the edge formed by the face and side of a type, to locate the types accurately and finally on the type-bars, said forward portion curving below the bottom of said body-portion, and means for securing said gage to said supporting surface, to clamp the razor-edge against said surface.

ALFRED G. F. KUROWSKI.